(12) United States Patent
Kuwabara

(10) Patent No.: US 7,573,562 B2
(45) Date of Patent: Aug. 11, 2009

(54) REFLECTIVE OPTICAL ELEMENT AND EXPOSURE APPARATUS

(75) Inventor: Seiji Kuwabara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/055,844

(22) Filed: Mar. 26, 2008

(65) Prior Publication Data

US 2008/0247044 A1    Oct. 9, 2008

(30) Foreign Application Priority Data

Mar. 29, 2007    (JP) ............................ 2007-086182

(51) Int. Cl.
*G03B 27/54*    (2006.01)
*G02B 1/10*    (2006.01)

(52) U.S. Cl. ....................................................... 355/67

(58) Field of Classification Search .................. 355/53, 355/55, 67–71; 359/359, 580–583, 838
See application file for complete search history.

(56) References Cited

U.S. PATENT DOCUMENTS

| | | | | |
|---|---|---|---|---|
| 5,007,710 A | * | 4/1991 | Nakajima et al. | ........... 359/589 |
| 5,130,603 A | * | 7/1992 | Tokailin et al. | ............. 313/504 |
| 5,198,930 A | * | 3/1993 | Muratomi | .................... 359/583 |
| 5,283,692 A | * | 2/1994 | Herbst | ......................... 359/580 |
| 7,172,294 B2 | | 2/2007 | Yano et al. | ..................... 353/84 |
| 7,411,656 B2 | * | 8/2008 | Totzeck et al. | ................. 355/71 |
| 2004/0114114 A1 | | 6/2004 | Yano et al. | ..................... 353/84 |
| 2006/0262389 A1 | * | 11/2006 | Zaczek | ........................ 359/359 |

FOREIGN PATENT DOCUMENTS

| | | |
|---|---|---|
| JP | 5-215915 | 8/1993 |
| JP | 6-138310 | 5/1994 |
| JP | 2003-107242 | 4/2003 |
| JP | 2003-344654 | 12/2003 |
| JP | 2006-227099 | 8/2006 |

* cited by examiner

*Primary Examiner*—Hung Henry Nguyen
(74) *Attorney, Agent, or Firm*—Fitzpatrick, Cella, Harper & Scinto

(57) ABSTRACT

An exposure apparatus includes (A) an illumination optical system that illuminates a reticle with illumination light from a light source, and (B) a projection optical system that includes a reflective optical element and projects a pattern of the reticle onto a member to be processed to expose the member. The reflective optical element includes (a) a base member, and (b) a dielectric multilayer film laminated on the base member. The dielectric multilayer film includes, in an order from a base member side, (i) a first multilayer group that is constituted by laminating at least four dielectric material layers, which includes at least two dielectric material layers having different refractive indices from each other and that has a first period length equivalent in optical film thickness, and (ii) a second multilayer group that is constituted by laminating at least four dielectric material layers, which includes at least two dielectric material layers having different refractive indices from each other and that has a second period length equivalent in optical film thickness longer than the first period length equivalent in optical film thickness. The dielectric multilayer films include a plurality of pairs of the first and second multilayer groups.

3 Claims, 7 Drawing Sheets

REFLECTIVE OPTICAL ELEMENT AND EXPOSURE APPARATUS

This application claims the benefit of Japanese Patent Application No. 2007-086182, filed on Mar. 29, 2007, which is hereby incorporated by reference herein in its entirety.

BACKGROUND OF THE INVENTION

The present invention relates to an exposure apparatus using a reflective optical element.

Display elements used for a television or a personal computer, such as liquid crystal displays (LCDs), have been required, in order to provide a larger screen. LCDs are manufactured by a photolithography (baking) technique to form a transparent thin-film electrode on a glass substrate. The exposure apparatus (liquid crystal exposure apparatus) that manufactures the LCD has a projection optical system, by which a mask and the glass substrate are scanned at a slit-like region to form a pattern of the transparent thin-film electrode.

With more displays having a larger screen (i.e., a larger glass substrate), more liquid crystal exposure apparatuses have been provided with a larger region in which exposure light is irradiated. However, an expansion of the exposure light irradiation region causes a decreased illuminance, preventing the throughput from being improved.

To solve this, a liquid crystal exposure apparatus that uses the projection optical system (mirror projection optical system) constituted by a reflective mirror (reflective optical element) has been proposed.

Since the mirror projection optical system causes no chromatic aberration in principle, when a mercury lamp is used as a light source, all bright line spectra of the mercury lamp can be simultaneously used as exposure energy.

Thus, broadening the wavelength band of exposure light (i.e., the wavelength band may be broadened to a line I, a line g, a line h, and a line j at a shorter wavelength side) can provide high illuminance.

On the other hand, alignment light used for the position adjustment (alignment) between the mask of the exposure apparatus and the glass substrate requires a reflective mirror that has a high reflectivity in a different wavelength from that of exposure light, and that can provide a desired phase difference between a reflected S-polarized light component and a reflected P-polarized light component. Furthermore, when several types of alignment lights are used, the above optical characteristic is required in all wavelength bands used for the alignment.

For this reason, the reflective mirror constituting an optical system of the liquid crystal exposure apparatus needs to have a desired reflection characteristic in a wavelength region of exposure light, and the desired reflection characteristic and the phase difference characteristic in a wavelength region of alignment light.

Conventionally, the reflective mirror that controls the phase difference includes a multilayer film mirror structured so that a metal film having a high reflectivity, such as aluminum (Al), copper (Cu) or silver (Ag), is formed on a surface of the glass substrate, and the metal film has thereon a protection film that protects corrosion and an enhanced reflection film that enhances reflectivity. The multilayer film mirror, as described above, is disclosed in Japanese Patent Unexamined Publication No. H06-138310 and Japanese Patent Unexamined Publication No. 2006-227099.

As a reflective mirror in which all layers consist of a dielectric material, a multilayer film mirror, in which a highly-refractive material and a lowly-refractive material are alternately laminated, is disclosed in Japanese Patent Unexamined Publication No. H05-215915.

Although a conventional reflective mirror composed of a metal and a dielectric material shows a stable phase difference characteristic (characteristic having a smaller manufacturing error), the conventional reflective mirror has a limited reflectivity characteristic and an abrasion resistance characteristic. For example, an absorption characteristic of the reflective mirror required for the exposure apparatus needs to be very small. The reason for this is that the exposure apparatus requires a clear reflected image, and has a deteriorated resolution, due to influence from heat that is generated. In other words, the reflective mirror requires almost 100% reflectivity. However, the use of a metal film finds a difficulty in achieving almost 100% reflectivity.

The conventional reflective mirror also requires a high abrasion resistance characteristic, because the reflective mirror must be handled with great care, so as to prevent any flaws from being generated on the surface of the reflective mirror, which causes difficulties in maintenance.

In the case of a full dielectric material mirror, in which all layers having superior absorption characteristics and abrasion resistance characteristics consist of a dielectric material, a ¼ wavelength film thickness multilayer group, for example, has a maximum reflectivity and reflection bandwidth, and the band can provide a phase difference characteristic having a substantially-fixed value. Furthermore, the full dielectric material mirror can broaden a width of a high reflectance region by laminating the ¼ wavelength film thickness multilayer groups having different period lengths.

However, the phase difference characteristic obtained by laminating the ¼ wavelength film thickness multilayer groups as described above has a so-called steep ripple, and has no stable characteristic in a wide band. Specifically, although a high reflectance band is broadened, a stable phase difference characteristic (characteristic having a small manufacturing error) is not obtained in this case.

In the current situation, no reflective mirror exists, as required by the exposure apparatus, for example, that has a superior abrasion resistance characteristic, that has a wide band and a high reflectivity, and that has a mild change in the characteristic to a wavelength of a reflection phase difference of S-polarized light and P-polarized light.

BRIEF SUMMARY OF THE INVENTION

The present invention provides an exposure apparatus using a reflective optical element that is particularly preferable for an exposure apparatus using a mirror projection optical system, and that has a superior abrasion resistance, a high reflectivity in a wide wavelength region, and a small fluctuation in characteristic of the phase difference between the reflected S- and P-polarized light components depending on wavelengths.

In one aspect, the present invention provides a reflective optical element included in a projection optical system of an exposure apparatus and includes a base member and a dielectric multilayer film laminated on the base member. The dielectric multilayer film includes, in an order from the base member side, a first multilayer group that is constituted by laminating at least four dielectric material layers that include at least two dielectric material layers having different refractive indices from each other and that has a first period length equivalent in optical film thickness, and a second multilayer group that is constituted by laminating at least four dielectric material layers that include at least two dielectric material layers having different refractive indices from each other and that has a second period length equivalent in optical film thickness longer than the first period length equivalent in optical film thickness.

As another aspect, the present invention provides a device manufacturing method including a step of exposing the member to be processed using the above-described exposure apparatus, and a step of developing the exposed member.

Other aspects of the present invention will become apparent from the following description and the attached drawings.

DETAILED DESCRIPTION OF THE EMBODIMENTS

Exemplary embodiments of the present invention will hereafter be described with reference to the accompanying drawings.

Figure 1:
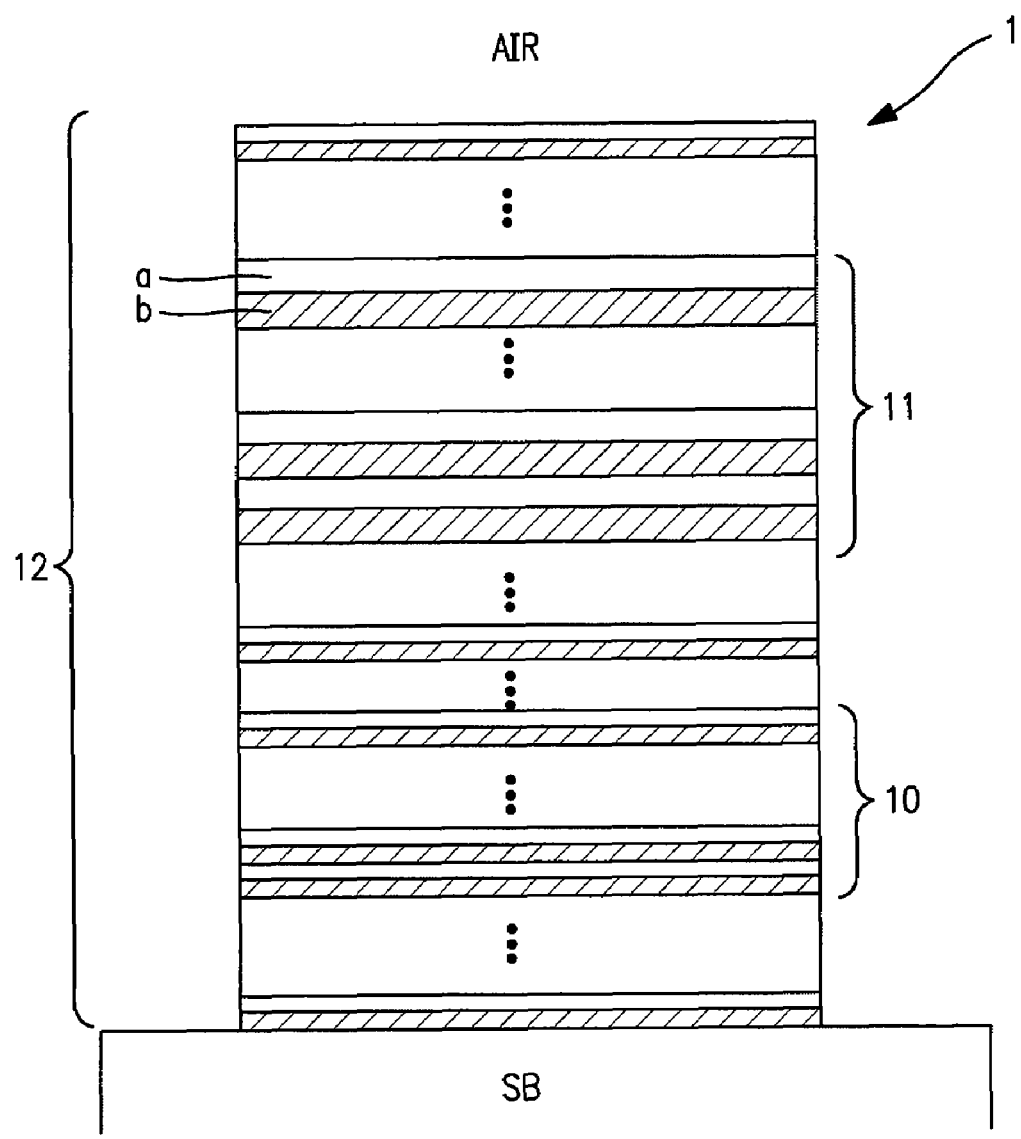
FIG. 1 is a cross-sectional view schematically illustrating a reflective mirror that is an embodiment of the present invention.

First, common matters in specific embodiments (which will be described later) will be described. FIG. 1 is a schematic view illustrating a cross section of a reflective mirror (reflective optical element) 1 that is a typical embodiment.

The reflective mirror 1 is used as an optical element constituting the projection optical system of the exposure apparatus, which has an illumination optical system that illuminates a reticle with illumination light from a light source, a projection optical system that projects a reticle pattern on a member to be processed, and an alignment mechanism that adjusts the positions of the reticle and the member to be processed.

In the embodiment, light entering the reflective mirror 1 has a center wavelength (designed central wavelength) $\lambda_0$ of 400 nm. The exposure apparatus uses lights having wavelengths of 365 nm, 405 nm, and 435 nm as exposure light, and uses lights having wavelengths of 546 nm, 578 nm, 644 nm, and 740 nm as alignment light.

As shown in FIG. 1, the reflective mirror 1 has a dielectric multilayer film 12 that is formed on a substrate (base member) SB polished to have a precise shape. A surface of the dielectric multilayer film 12, opposite to the substrate SB, is exposed to air.

The dielectric multilayer film 12 is constituted by alternately laminating a dielectric material layer a having a first refractive index (hereafter, referred to as a low refractive index layer) and a dielectric material layer b having a second refractive index higher than the first refractive index (hereafter, referred to as a high refractive index layer). It is noted that the low refractive index layer a and the high refractive index layer b also may be laminated in an opposite order. When a dielectric material layer having a refractive index that is between those of the low refractive index layer a and the high refractive index layer b is used as an intermediate refractive index layer, the low refractive index layer, the intermediate refractive index layer, the high refractive index layer, the intermediate refractive index layer, the low refractive index layer, the intermediate refractive index layer, and the high refractive index layer also may be laminated in this order.

The dielectric multilayer film 12 includes a plurality of combinations of multilayer groups (e.g., multilayer groups 10 and 11) having different period lengths equivalent in optical film thickness (hereafter simply referred to as a period length) from one another constituted by laminating at least four dielectric material layers that include at least two dielectric material layers having different refractive indices from each other. Each multilayer group is, for example, a dielectric material multilayer group (hereafter referred to as an alternate multilayer group) constituted by alternately laminating the low refractive index layer a and the high refractive index layer b. However, as described above, the intermediate refractive index layer can be disposed between the low refractive index layer a and the high refractive index layer b in the alternate multilayer group. In other words, the alternate multilayer group also may include three or more dielectric material layers having different refractive indices from one another.

When two alternate multilayer groups constituting each of the above respective combinations are compared to each other, the air-side alternate multilayer group has a period length that is longer than a period length of the substrate-side alternate multilayer group. For example, the substrate-side alternate multilayer group 10 (the first multilayer group), shown in FIG. 1, has a period length shorter than that of the air-side alternate multilayer group 11 (the second multilayer group). In other words, the dielectric multilayer film 12 includes a plurality of combinations of alternate multilayer groups having the same period length relation as in the multilayer groups 10 and 11.

Furthermore, at least a part of light entering the reflective mirror 1 has a wavelength range between $2 k_{min}\lambda_0/4$ and $2 k_{max}\lambda_0/4$. In this case, a plurality of specific multilayer groups constituting the above plurality of combinations of alternate multilayer groups and that have a period length between $k_{min}\lambda_0/4$ and $k_{max}\lambda_0/4$ preferably satisfy the following conditions.

Specifically, the specific multilayer groups preferably have, from the substrate-side specific multilayer group, a period length that satisfies:

$$k_1\lambda_0/4 < k_2\lambda_0/4 < \ldots k_i\lambda_0/4 < \ldots < k_n\lambda_0/4 \qquad (1)$$

where $k_{min} \leq k_1 < k_2 < \ldots k_i \ldots < k_n \leq k_{max}$, $1 \leq i \leq n$, $n \geq 2$, $k_n$ is a positive value, and "i" is a positive integer.

The embodiment has provided all alternate multilayer groups included in the dielectric multilayer film 12 that are laminated in an order from the one having a shorter period length from the substrate side (i.e., in order to satisfy the conditions (1)). However, it is not always required to satisfy the conditions (1) in a wavelength range other than a wavelength range in which the reflective mirror 1 controls the S-P reflection phase difference characteristic (which will be described later).

Alternatively, the entire light entering the reflective mirror 1 also may have a wavelength range between $2k_{min}\lambda_0/4$ and $2\lambda_{max}\lambda_0/4$.

In the embodiment, when light entering the reflective mirror 1 has a center wavelength of $\lambda_0$ (400 nm in this embodiment), four or more dielectric material layers constituting each of the respective alternate multilayer groups preferably have an optical film thickness different from an integral multiple of $\lambda_0/4$. However, at least one of the four or more dielectric material layers also may have an optical film thickness that is an integral multiple of $\lambda_0/4$.

In the embodiment, the substrate SB is a glass substrate made of quartz, borosilicate crown glass (BK7), or zerodur, for example.

The low refractive index layer a has a refractive index between 1.35 and 1.55. The low refractive index layer a is made of, for example, one of or a mixture of two or more of quartz ($SiO_2$), magnesium fluoride ($MgF_2$), calcium fluoride ($CaF_2$), and aluminum fluoride ($AlF_3$).

The high refractive index layer b has a refractive index between 1.85 and 2.4. The high refractive index layer b is, for example, one or a mixture of two or more of tantalum pentoxide ($Ta_2O_5$), hafnium oxide ($HfO_2$), oxidized zirconium ($ZrO_2$), yttrium oxide ($Y_2O_3$), and oxidized scandium ($Sc_2O_3$).

The intermediate refractive index layer has a refractive index between 1.6 and 1.75. The intermediate refractive index layer is made of, for example, one or a mixture of two or more of aluminum oxide ($Al_2O_3$), magnesium oxide (MgO), and thorium dioxide ($ThO_2$).

The dielectric multilayer film 12 is formed on the substrate SB by a known film formation technique, such as vacuum deposition, sputtering, or ion plating. In the embodiment, the respective dielectric material layers can have optimal film thicknesses, and the conditions (1) can be satisfied to provide optical characteristics (which will be described later). However, the conditions (1) are not conditions that must always be satisfied, but conditions that are preferably satisfied.

The following section will describe specific embodiments (examples of materials and simulation of values) of the reflective optical element. It is noted that the following respective embodiments will assume that a plurality of alternate multilayer groups are composed of, in an order from the most substrate-side alternate multilayer group, the first group, the second group, the third group, and so on.

Embodiment 1

The reflective mirror 1 of embodiment 1 uses a low refractive index layer a made of $SiO_2$ (refractive index: 1.47) and a high refractive index layer b made of $Ta_2O_5$ (refractive index: 2.26). The reflective mirror 1 of this embodiment has a designed central wavelength $\lambda_0$ of 400 nm and the substrate SB made of quartz (refractive index: 1.47). The film configuration of the reflective mirror 1 of this embodiment is shown in Table 1.

As can be seen from Table 1, the period length is increased in an order from the substrate side to the air side (i.e., in an order from the first group to the seventh group).

A wavelength range within which the reflective mirror 1 controls the phase difference characteristic of the reflected S-polarized light component and the reflected P-polarized light component (the S-P reflection phase difference characteristic) (i.e., a wavelength range of a part of light entering the reflective mirror 1) is from 540 ($5.4\lambda_0/4$) nm to $7.5\lambda_0/4$) nm. Thus, the fifth group, the sixth group, and the seventh group, which are specific multilayer groups having a period length between $2.7\lambda_0/4$ and $3.75\lambda_0/4$ among the first group to the seventh group, have a longer period length from the substrate side to the air side (i.e., in an order from the fifth group to the seventh group), as can be seen from Table 1.

TABLE 1

EMBODIMENT 1

| | MATERIAL | OPTICAL FILM THICKNESS | MULTI-LAYER GROUP | PERIOD LENGTH |
|---|---|---|---|---|
| SUBSTRATE | QUARTZ ($SiO_2$) | | | |
| 1ST LAYER | TANTALUM PENTOXIDE ($Ta_2O_5$) | $0.51\lambda_0/4$ | | |
| 2ND LAYER | QUARTZ ($SiO_2$) | $0.78\lambda_0/4$ | FIRST GROUP | $1.62\,\lambda_0/4$ |
| 3RD TO 10TH LAYERS | TANTALUM PENTOXIDE ($Ta_2O_5$) | $0.85\lambda_0/4$ | | |
| | QUARTZ ($SiO_2$) | $0.77\lambda_0/4$ | | |
| 11TH LAYER | TANTALUM PENTOXIDE ($Ta_2O_5$) | $0.87\lambda_0/4$ | | |
| 12TH LAYER | QUARTZ ($SiO_2$) | $0.67\lambda_0/4$ | SECOND GROUP | $1.84\,\lambda_0/4$ |
| 13TH TO 18TH LAYERS | TANTALUM PENTOXIDE ($Ta_2O_5$) | $0.88\lambda_0/4$ | | |
| | QUARTZ ($SiO_2$) | $0.96\lambda_0/4$ | | |
| 19TH LAYER | TANTALUM PENTOXIDE ($Ta_2O_5$) | $1.25\lambda_0/4$ | | |
| 20TH LAYER | QUARTZ ($SiO_2$) | $0.88\lambda_0/4$ | THIRD GROUP | $2.01\,\lambda_0/4$ |
| 21TH TO 26TH LAYERS | TANTALUM PENTOXIDE ($Ta_2O_5$) | $0.97\lambda_0/4$ | | |
| | QUARTZ ($SiO_2$) | $1.04\lambda_0/4$ | | |
| 27TH LAYER | TANTALUM PENTOXIDE ($Ta_2O_5$) | $1.16\lambda_0/4$ | | |
| 28TH LAYER | QUARTZ ($SiO_2$) | $0.79\lambda_0/4$ | FOURTH GROUP | $2.32\,\lambda_0/4$ |
| 29TH TO 32TH LAYERS | TANTALUM PENTOXIDE ($Ta_2O_5$) | $1.18\lambda_0/4$ | | |
| | QUARTZ ($SiO_2$) | $1.14\lambda_0/4$ | | |

TABLE 1-continued

EMBODIMENT 1

| | MATERIAL | OPTICAL FILM THICKNESS | MULTI-LAYER GROUP | PERIOD LENGTH |
|---|---|---|---|---|
| 33TH TO 38TH LAYERS | TANTALUM PENTOXIDE (Ta$_2$O$_5$) | 1.65$\lambda_0$/4 | FIFTH GROUP | 2.87 $\lambda_0$/4 |
| | QUARTZ (SiO$_2$) | 1.22$\lambda_0$/4 | | |
| 39TH LAYER | TANTALUM PENTOXIDE (Ta$_2$O$_5$) | 1.43$\lambda_0$/4 | | |
| 40TH LAYER | QUARTZ (SiO$_2$) | 1.22$\lambda_0$/4 | | |
| 41ST TO 46TH LAYERS | TANTALUM PENTOXIDE (Ta$_2$O$_5$) | 1.75$\lambda_0$/4 | SIXTH GROUP | 3.54 $\lambda_0$/4 |
| | QUARTZ (SiO$_2$) | 1.79$\lambda_0$/4 | | |
| 47TH TO 50TH LAYERS | TANTALUM PENTOXIDE (Ta$_2$O$_5$) | 1.90$\lambda_0$/4 | SEVENTH GROUP | 3.73 $\lambda_0$/4 |
| | QUARTZ (SiO$_2$) | 1.83$\lambda_0$/4 | | |
| 51ST LAYER | TANTALUM PENTOXIDE (Ta$_2$O$_5$) | 1.84$\lambda_0$/4 | | |
| 52ND LAYER | QUARTZ (SiO$_2$) | 0.87$\lambda_0$/4 | | |
| MEDIUM | AIR | | | |

Figure 2:
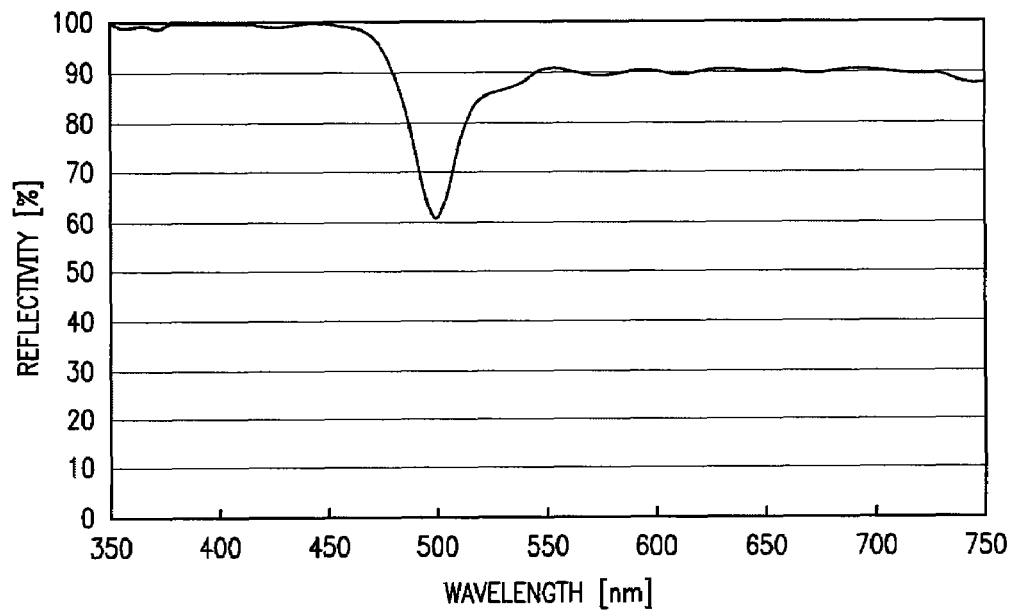
FIG. 2 shows a spectral reflectance characteristic of the reflective mirror of the first embodiment.

FIG. 2 shows the spectral reflectance characteristic when light enters the reflective mirror 1 of this embodiment with an incidence angle of 20 degrees. In FIG. 2, the horizontal axis shows a wavelength [nm] of light entering the reflective mirror 1 and the vertical axis shows a reflectivity [%]. It is noted that the horizontal axis and the vertical axis, as described above, also apply to graphs of the spectral reflectance characteristics in other embodiments (which will be described later).

Figure 3:
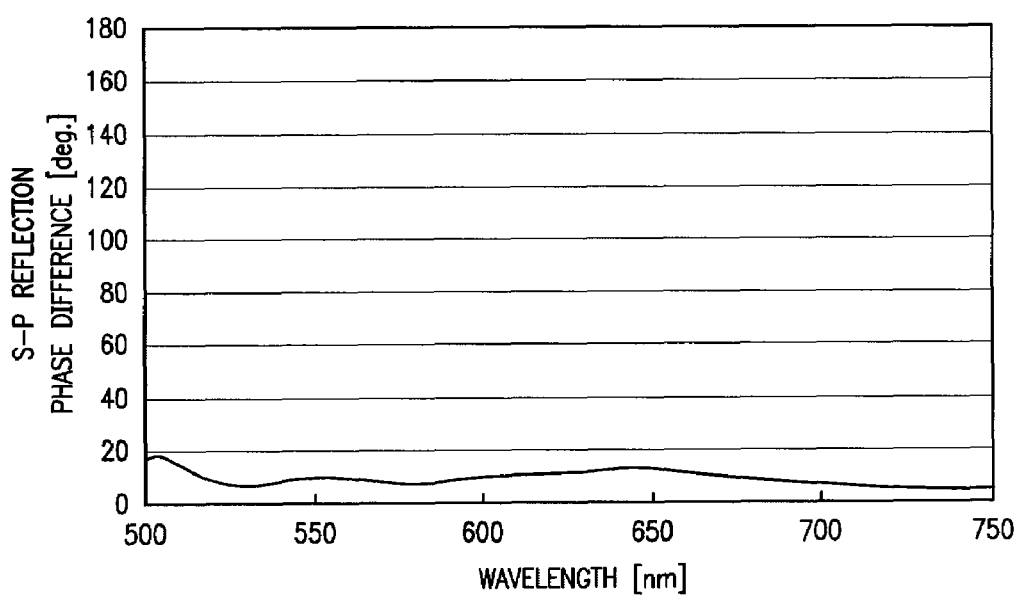
FIG. 3 shows an S-P reflection phase difference characteristic of the reflective mirror of the first embodiment.

FIG. 3 shows the S-P reflection phase difference characteristic when light enters the reflective mirror 1 of this embodiment with an incidence angle of 20 degrees. In FIG. 3, the horizontal axis shows the wavelength [nm] of light entering the reflective mirror 1 and the vertical axis shows the S-P reflection phase difference [deg.].

It is noted that the horizontal axis and the vertical axis, as described above, also apply to graphs of the spectral reflectance characteristics in other embodiments (which will be described later).

As shown in FIG. 2, the reflective mirror 1 of this embodiment realizes a high reflectivity of 98% or more in a wide wavelength range from 350 nm to 450 nm. As shown in FIG. 2 and FIG. 3, the reflective mirror 1 of this embodiment has a reflectivity of 88% or more even in a wide wavelength range from 540 nm to 750 nm and has a flat phase difference characteristic having the maximum value of 12.9° and the minimum value of 7.8° between the reflected S-polarized light component and the reflected P-polarized light component. In other words, the reflective mirror 1 of this embodiment has a phase difference characteristic having a small fluctuation to the wavelength.

Embodiment 2

The reflective mirror 1 of the second embodiment uses a low refractive index layer a made of SiO$_2$ (refractive index: 1.47) and a high refractive index layer b made of Ta$_2$O$_5$ (refractive index: 2.26). A part of the low refractive index layer is substituted with the intermediate refractive index layer made of Al$_2$O$_3$ (refractive index: 1.67).

The reflective mirror 1 of this embodiment also uses the designed central wavelength $\lambda_0$ of 400 nm and the substrate SB made of quartz (refractive index: 1.47). Table 2 shows the film configuration of the reflective mirror 1 of this embodiment.

As can be seen from Table 2, the period length is increased in an order from the substrate side to the air side (i.e., in an order from the first group to the seventh group).

A wavelength range within which the reflective mirror 1 controls the S-P reflection phase difference characteristic is from 520 (5.2$\lambda_0$/4) nm to 750 (7.5$\lambda_0$/4) nm. Thus, the fourth group, the fifth group, the sixth group, and the seventh group, which are specific multilayer groups having a period length of 2.6$\lambda_0$/4 or more and 3.75$\lambda_0$/4 or less among the first group to the seventh group, have a longer period length from the substrate side to the air side (i.e., in an order from the fourth group to the seventh group), as can be seen from Table 2.

TABLE 2

EMBODIMENT 2

| | MATERIAL | OPTICAL FILM THICKNESS | MULTI-LAYER GROUP | PERIOD LENGTH |
|---|---|---|---|---|
| SUBSTRATE | QUARTZ (SiO$_2$) | | | |
| 1ST LAYER | TANTALUM PENTOXIDE (Ta$_2$O$_5$) | 2.74$\lambda_0$/4 | | |
| 2ND LAYER | QUARTZ (SiO$_2$) | 0.25$\lambda_0$/4 | | |
| 3RD TO | TANTALUM | 0.86$\lambda_0$/4 | FIRST | 1.78 $\lambda_0$/4 |

TABLE 2-continued

EMBODIMENT 2

| | MATERIAL | OPTICAL FILM THICKNESS | MULTI-LAYER GROUP | PERIOD LENGTH |
|---|---|---|---|---|
| 8TH LAYERS | PENTOXIDE ($Ta_2O_5$) | | GROUP | |
| | QUARTZ ($SiO_2$) | $0.96\lambda_0/4$ | | |
| 9TH LAYER | TANTALUM PENTOXIDE ($Ta_2O_5$) | $0.55\lambda_0/4$ | | |
| 10TH LAYER | QUARTZ ($SiO_2$) | $0.84\lambda_0/4$ | | |
| 11TH TO 16TH LAYERS | TANTALUM PENTOXIDE ($Ta_2O_5$) | $0.98\lambda_0/4$ | SECOND GROUP | $1.98\lambda_0/4$ |
| | QUARTZ ($SiO_2$) | $1.00\lambda_0/4$ | | |
| 17TH LAYER | TANTALUM PENTOXIDE ($Ta_2O_5$) | $1.11\lambda_0/4$ | | |
| 18TH LAYER | QUARTZ ($SiO_2$) | $0.58\lambda_0/4$ | | |
| 19TH TO 24TH LAYERS | TANTALUM PENTOXIDE ($Ta_2O_5$) | $1.08\lambda_0/4$ | THIRD GROUP | $2.32\lambda_0/4$ |
| | QUARTZ ($SiO_2$) | $1.24\lambda_0/4$ | | |
| 25TH LAYER | TANTALUM PENTOXIDE ($Ta_2O_5$) | $1.22\lambda_0/4$ | | |
| 26TH TO 31ST LAYERS | TANTALUM PENTOXIDE ($Ta_2O_5$) | $1.28\lambda_0/4$ | FOURTH GROUP | $2.63\lambda_0/4$ |
| | QUARTZ ($SiO_2$) | $1.35\lambda_0/4$ | | |
| 32ND LAYERS | TANTALUM PENTOXIDE ($Ta_2O_5$) | $0.26\lambda_0/4$ | | |
| 33RD TO 36TH LAYERS | TANTALUM PENTOXIDE ($Ta_2O_5$) | $1.60\lambda_0/4$ | FIFTH GROUP | $3.03\lambda_0/4$ |
| | ALUMINUM OXIDE ($Al_2O_3$) | $1.43\lambda_0/4$ | | |
| 37TH TO 42ND LAYERS | TANTALUM PENTOXIDE ($Ta_2O_5$) | $1.83\lambda_0/4$ | SIXTH GROUP | $3.53\lambda_0/4$ |
| | ALUMINUM OXIDE ($Al_2O_3$) | $1.70\lambda_0/4$ | | |
| 43RD LAYER | TANTALUM PENTOXIDE ($Ta_2O_5$) | $1.93\lambda_0/4$ | | |
| 44TH LAYER | QUARTZ ($SiO_2$) | $1.95\lambda_0/4$ | | |
| 45TH TO 50TH LAYERS | TANTALUM PENTOXIDE ($Ta_2O_5$) | $1.86\lambda_0/4$ | SEVENTH GROUP | $3.58\lambda_0/4$ |
| | ALUMINUM OXIDE ($Al_2O_3$) | $1.72\lambda_0/4$ | | |
| 51ST LAYER | TANTALUM PENTOXIDE ($Ta_2O_5$) | $1.92\lambda_0/4$ | | |
| 52ND LAYER | QUARTZ ($SiO_2$) | $1.08\lambda_0/4$ | | |
| MEDIUM | AIR | | | |

Figure 4:
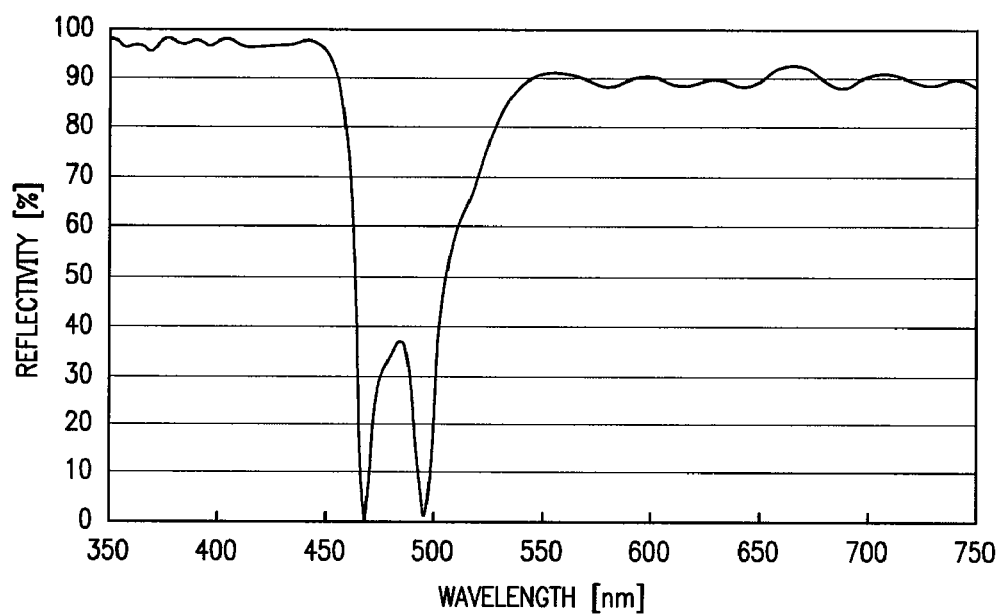
FIG. 4 shows the spectral reflectance characteristic of the reflective mirror of a second embodiment.

FIG. 4 illustrates the spectral reflectance characteristic when light enters the reflective mirror 1 of this embodiment, with an incidence angle of 10 degrees.

Figure 5:
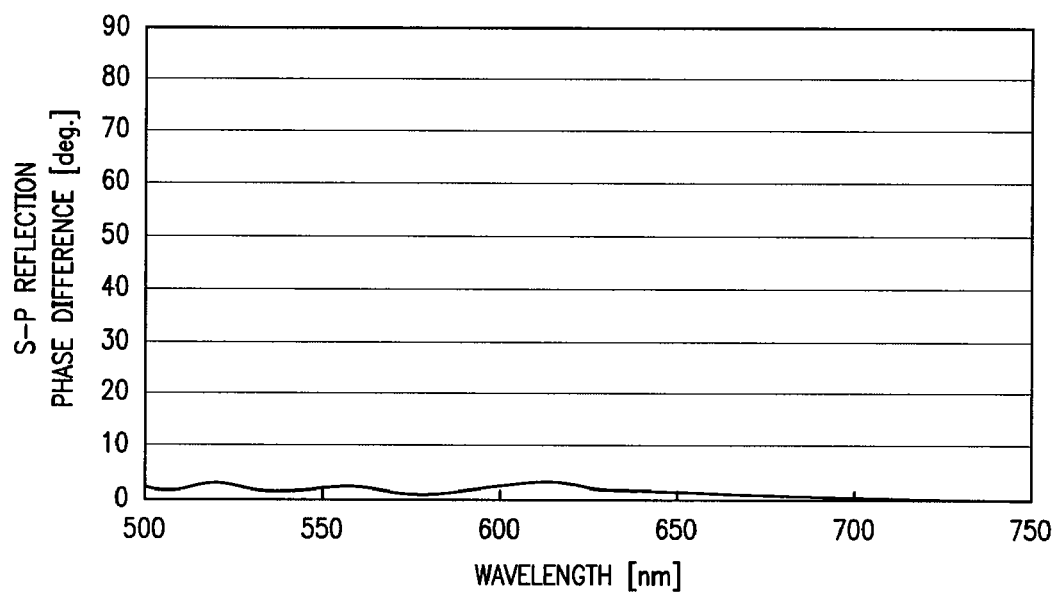
FIG. 5 shows the S-P reflection phase difference characteristic of the reflective mirror of the second embodiment.

FIG. 5 illustrates the S-P reflection phase difference characteristic when light enters the reflective mirror 1 of this embodiment with an incidence angle of 10 degrees.

As shown in FIG. 4, the reflective mirror 1 of this embodiment realizes a high reflectivity of 96% or more in a wide wavelength range from 350 nm to 450 nm. As shown in FIG. 4 and FIG. 5, the reflective mirror 1 of this embodiment has a high reflectivity of 70% or more in a wide wavelength range from 520 nm to 750 nm and has a flat phase difference characteristic having a maximum value of 3.5° and a minimum value of 1.5° between the reflected S-polarized light component and the reflected P-polarized light component. In other words, the reflective mirror 1 of this embodiment has a phase difference characteristic having a small fluctuation to the wavelength.

Embodiment 3

The reflective mirror 1 of the third embodiment uses a low refractive index layer a made of $SiO_2$ (refractive index: 1.47) and the high refractive index layer b made of $Ta_2O_5$ (refractive index: 2.26).

The reflective mirror 1 of this embodiment also uses the designed central wavelength $\lambda_0$ of 400 nm and the substrate SB made of quartz (refractive index: 1.47). Table 3 shows a film configuration of the reflective mirror 1 of this embodiment.

As can be seen from Table 3, the period length is increased in an order from the substrate side to the air side (i.e., in an order from the first group to the eighth group).

A wavelength range within which the reflective mirror 1 controls the S-P reflection phase difference characteristic is from 530 ($5.3\lambda_0/4$) nm to 800 ($8.0\lambda_0/4$) nm. Thus, the fourth group, the fifth group and the sixth group, which are specific multilayer groups having a period length of $2.65\lambda_0/4$ or more and $4.0\lambda_0/4$ or less among the first group to the eighth group, have a longer period length from the substrate side to the air side (i.e., in an order from the fourth group to the sixth group), as can be seen from Table 3.

TABLE 3

EMBODIMENT 3

| | MATERIAL | OPTICAL FILM THICKNESS | MULTI-LAYER GROUP | PERIOD LENGTH |
|---|---|---|---|---|
| SUBSTRATE | QUARTZ (SiO$_2$) | | | |
| 1ST LAYER | TANTALUM PENTOXIDE (Ta$_2$O$_5$) | 0.57λ$_0$/4 | | |
| 2ND LAYER | QUARTZ (SiO$_2$) | 1.25λ$_0$/4 | | |
| 3RD TO 12TH LAYERS | TANTALUM PENTOXIDE (Ta$_2$O$_5$) | 0.95λ$_0$/4 | FIRST GROUP | 1.94 λ$_0$/4 |
| | QUARTZ (SiO$_2$) | 0.99λ$_0$/4 | | |
| 13TH LAYER | TANTALUM PENTOXIDE (Ta$_2$O$_5$) | 0.91λ$_0$/4 | | |
| 14TH LAYER | QUARTZ (SiO$_2$) | 1.00λ$_0$/4 | | |
| 15TH TO 22ND LAYERS | TANTALUM PENTOXIDE (Ta$_2$O$_5$) | 0.97λ$_0$/4 | SECOND GROUP | 2.21 λ$_0$/4 |
| | QUARTZ (SiO$_2$) | 1.24λ$_0$/4 | | |
| 23RD LAYER | TANTALUM PENTOXIDE (Ta$_2$O$_5$) | 1.52λ$_0$/4 | | |
| 24TH LAYER | QUARTZ (SiO$_2$) | 0.93λ$_0$/4 | | |
| 25TH LAYER | TANTALUM PENTOXIDE (Ta$_2$O$_5$) | 1.09λ$_0$/4 | | |
| 26TH LAYER | QUARTZ (SiO$_2$) | 1.28λ$_0$/4 | | |
| 27TH TO 30TH LAYERS | TANTALUM PENTOXIDE (Ta$_2$O$_5$) | 1.56λ$_0$/4 | THIRD GROUP | 2.44 λ$_0$/4 |
| | QUARTZ (SiO$_2$) | 0.88λ$_0$/4 | | |
| 31ST LAYERS | TANTALUM PENTOXIDE (Ta$_2$O$_5$) | 0.73λ$_0$/4 | | |
| 32ND LAYER | QUARTZ (SiO$_2$) | 0.89λ$_0$/4 | | |
| 33RD TO 36TH LAYERS | TANTALUM PENTOXIDE (Ta$_2$O$_5$) | 1.35λ$_0$/4 | FOURTH GROUP | 2.69 λ$_0$/4 |
| | QUARTZ (SiO$_2$) | 1.34λ$_0$/4 | | |
| 37TH TO 40TH LAYERS | TANTALUM PENTOXIDE (Ta$_2$O$_5$) | 1.57λ$_0$/4 | FIFTH GROUP | 3.38 λ$_0$/4 |
| | QUARTZ (SiO$_2$) | 1.81λ$_0$/4 | | |
| 41ST LAYER | TANTALUM PENTOXIDE (Ta$_2$O$_5$) | 1.58λ$_0$/4 | | |
| 42ND LAYER | QUARTZ (SiO$_2$) | 1.72λ$_0$/4 | | |
| 43RD TO 46TH LAYERS | TANTALUM PENTOXIDE (Ta$_2$O$_5$) | 1.83λ$_0$/4 | SIXTH GROUP | 3.94 λ$_0$/4 |
| | QUARTZ (SiO$_2$) | 2.11λ$_0$/4 | | |
| 47TH TO 50TH LAYERS | TANTALUM PENTOXIDE (Ta$_2$O$_5$) | 1.88λ$_0$/4 | SEVENTH GROUP | 4.32 λ$_0$/4 |
| | QUARTZ (SiO$_2$) | 2.44λ$_0$/4 | | |
| 51ST TO 54TH LAYERS | TANTALUM PENTOXIDE (Ta$_2$O$_5$) | 1.95λ$_0$/4 | EIGHTH GROUP | 4.87 λ$_0$/4 |
| | QUARTZ (SiO$_2$) | 2.92λ$_0$/4 | | |
| 55TH LAYER | TANTALUM PENTOXIDE (Ta$_2$O$_5$) | 1.99λ$_0$/4 | | |
| 56TH LAYER | QUARTZ (SiO$_2$) | 1.10λ$_0$/4 | | |
| MEDIUM | AIR | | | |

Figure 6:
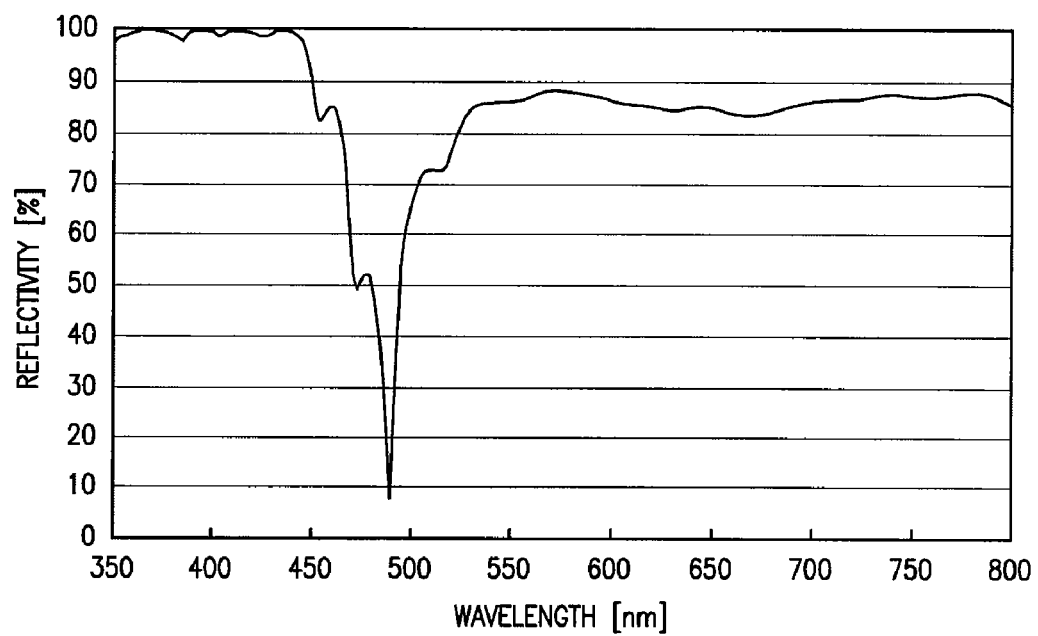
FIG. 6 shows the spectral reflectance characteristic of the reflective mirror of a third embodiment.
Figure 7:
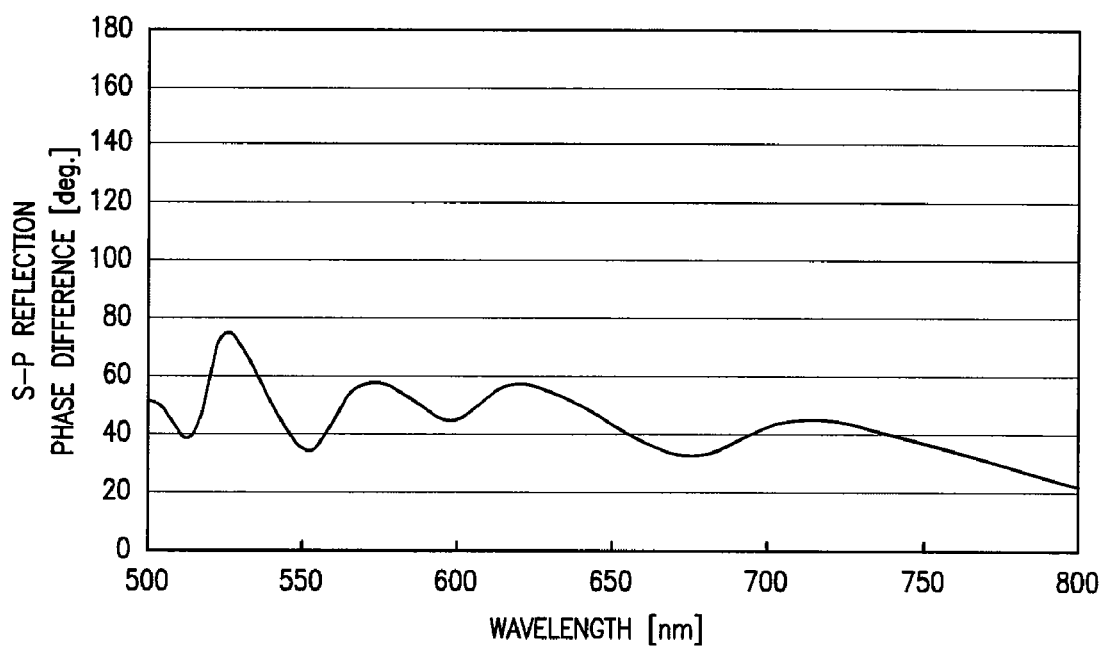
FIG. 7 shows the S-P reflection phase difference characteristic of the reflective mirror of the third embodiment.

FIG. 6 shows the spectral reflectance characteristic when light enters the reflective mirror 1 of this embodiment with an incidence angle of 45 degrees. FIG. 7 shows the S-P reflection phase difference characteristic when light enters the reflective mirror 1 of this embodiment with an incidence angle of 45 degrees.

As shown in FIG. 6, the reflective mirror 1 of this embodiment realizes a high reflectivity of 96% or more in a wide wavelength range from 350 nm to 440 nm. As shown in FIG. 6 and FIG. 7, the reflective mirror 1 of this embodiment has a high reflectivity of 83% or more even in a wide wavelength range from 530 nm to 800 nm, and has a flat phase difference characteristic of the maximum value of 57.4° and the minimum value of 32.8° between the reflected S-polarized light component and the reflected P-polarized light component. In other words, the reflective mirror 1 of this embodiment has a phase difference characteristic having a small fluctuation to the wavelength.

As described above, the reflective mirror 1 of the above embodiment has a high reflectivity to the exposure light in the exposure apparatus and the wavelength band of the alignment light (which will be described later) and reduces a ripple of the S-P reflection phase difference characteristic in an alignment wavelength region. This can provide a stable optical characteristic, thereby reducing the manufacturing error in the reflective mirror.

Embodiment 4

Figure 8:
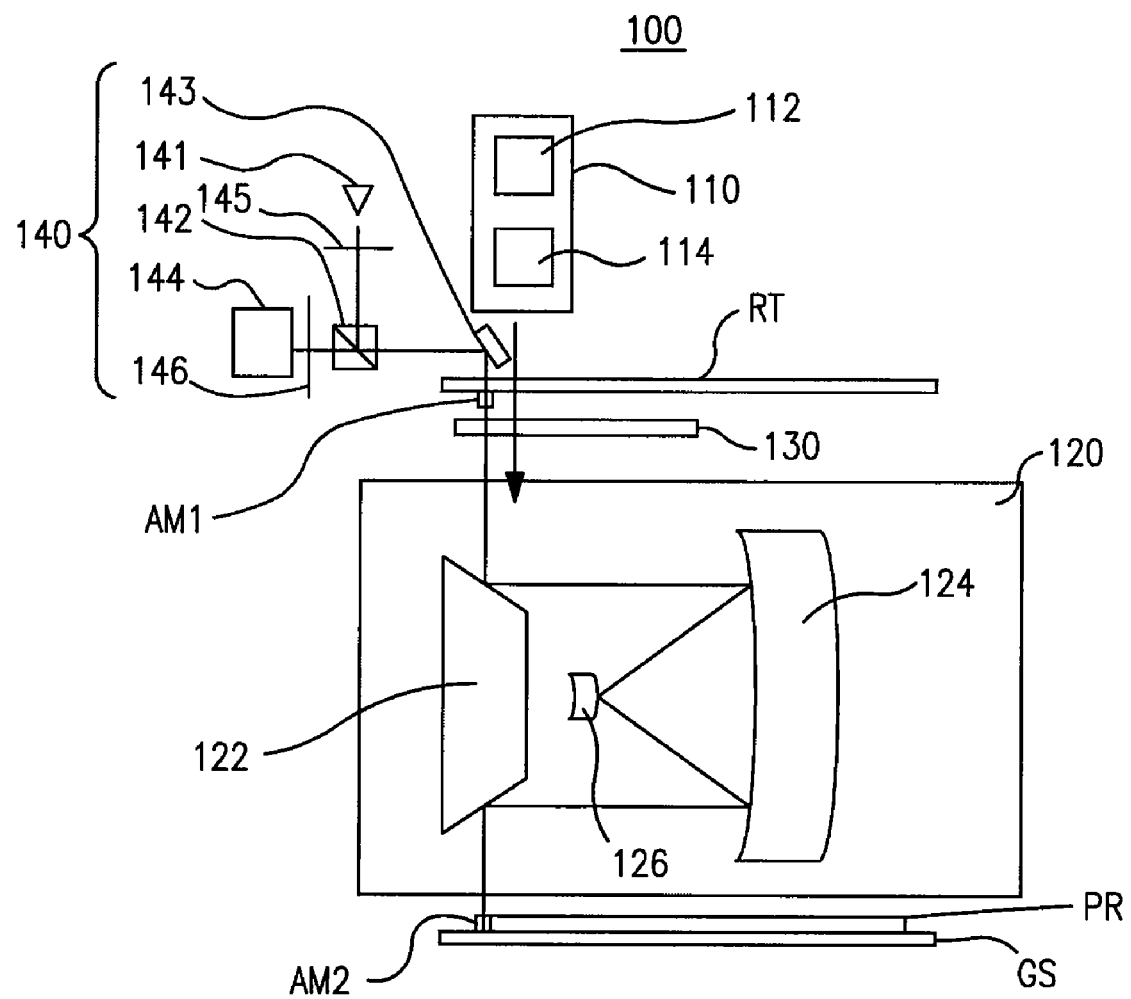
FIG. 8 is a cross-sectional view schematically showing an exposure apparatus in a fourth embodiment of the present invention.

Next, with reference to FIG. 8, the following section will describe an example of an exposure apparatus of the reflective mirror 1 described in the above respective embodiments.

The exposure apparatus 100 is a projection exposure apparatus that uses the step and scan method to expose a circuit pattern formed on the reticle RT to the member to be processed GS coated with photoresist PR, for example.

The exposure apparatus 100 is preferred for manufacturing a liquid crystal display, for example. The member to be processed GS is a glass substrate in this embodiment.

The exposure apparatus 100 also has a function as a monitoring apparatus that monitors the reticle RT and the member to be processed GS. FIG. 8 shows a condition where the exposure apparatus 100 monitors the member to be processed GS.

The exposure apparatus 100 has an illumination apparatus 110, a projection optical system 120, a compensation optical system 130, and an alignment mechanism 140.

The illumination apparatus 110 illuminates the reticle RT, including a transfer pattern, and has a light source 112 and an illumination optical system 114. In this embodiment, the light source 112 uses a mercury lamp as a light source. In other words, the light source 112 emits vacuum-ultraviolet light. It is noted that the number of the light source(s) is not limited.

The illumination optical system 114 is an optical system that illuminates the reticle RT. The illumination optical system 114 includes a lens, a mirror, an optical integrator, and a stop, for example. For example, the illumination optical system 114 includes an arrangement of the capacitor lens, the optical integrator, the aperture stop, the capacitor lens, the slit, and an imaging optical system. The optical integrator includes an integrator obtained by superposing fly-eye lenses or two pairs of cylindrical lens array plates (or lenticular lens plates), for example. However, the optical integrator may be substituted with an optical rod or a diffractive element.

The projection optical system 120 is an optical system that projects the pattern of the reticle RT on the member to be processed GS. In this embodiment, the projection optical system 120 has a flat mirror 122, a concave mirror 124, and a convex mirror 126. All mirrors constituting the projection optical system 120 can be the reflective mirror 1 of the above embodiment. As described above, the reflective mirror 1 has a high reflectivity in the wavelength region of the exposure light and, thus, can obtain a high illuminance, thereby realizing a high throughput.

The compensation optical system 130 is an optical system that compensates for the aberration of the projection optical system 120. The compensation optical system 130 includes one or more optical elements. In this embodiment, the compensation optical system 130 is composed of a compensation glass that is a transmissive optical element and is provided between the reticle RT and the projection optical system 120.

The alignment mechanism 140 has a function to provide an alignment (position adjustment) between the reticle RT and the member to be processed GS. The alignment mechanism 140 has an alignment light source 141, a polarizing plate 145, a half mirror 142, a mirror 143, a polarizing plate 146, and a detector 144. The alignment light source 141 is an illumination light source for an alignment purpose and is used for the position adjustment between an alignment mark AM1 on the reticle RT and an alignment mark AM2 on the member to be processed GS.

Light flux from the alignment light source 141 is converted by the polarizing plate 145 into linearly-polarized light to illuminate the alignment mark AM1 via the half mirror 142 and the mirror 143. Reflected light reflected by a back face of the reticle RT passes through the mirror 143 and the half mirror 142 to enter the polarizing plate 146. The polarizing plate 146 is rotated to block this reflected light from entering the detector 144.

On the other hand, light transmitted through the alignment mark AM1 enters the projection optical system 120. It is noted that, in this embodiment, the phase difference of ninety degrees is designed to be caused while light is reflected by a flat mirror 122, a concave mirror 124, and a convex mirror 126, five times, to reach the alignment mark AM2 on the member to be processed GS. Light reaching the alignment mark AM2 is circularly-polarized light.

Light reflected by the alignment mark AM2 on the member to be processed GS passes through the projection optical system 120 again to return to the reticle RT. Then, the light flux is given with the phase difference again and, thus, light reaching the reticle RT is linearly-polarized light.

The light flux has a polarizing plane that is orthogonal to the polarizing plane of illumination light flux entering the reticle RT.

The reflected light from the member to be processed GS illuminates the reticle RT, and is scattered by the reticle RT pattern. The scattered light has the same polarizing state as that of the reflected light from the member to be processed GS. Thus, the reflected light from the member to be processed GS and the scattered light at the reticle RT pass through the half mirror 142 and the polarizing plate 146 to enter the detector 144. As a result, the detector 144 can detect the reticle RT and the member to be processed GS.

The reticle RT and the member to be processed GS are in a conjugate relation. Thus, the linearly-polarized light reflected by the back face of the reticle RT can be removed to prevent flare caused by straight reflected light from the reticle RT, to simultaneously detect images of the reticle RT and the member to be processed GS with a superior contrast. This can provide an accurate alignment between the reticle RT and the member to be processed GS.

In the exposure, the light flux emitted from the illumination apparatus 110 subjects the reticle RT to Kohler illumination, for example. Light that has passed the reticle RT to reflect the reticle pattern is imaged by the projection optical system 120 into the member to be processed GS. In this embodiment, the projection optical system 102 has the reflective mirror 1 of the above embodiment. This can suppress the loss of the light intensity of the exposure light and the alignment light to provide the exposure with a high throughput and an accurate alignment.

Embodiment 5

Figure 9:
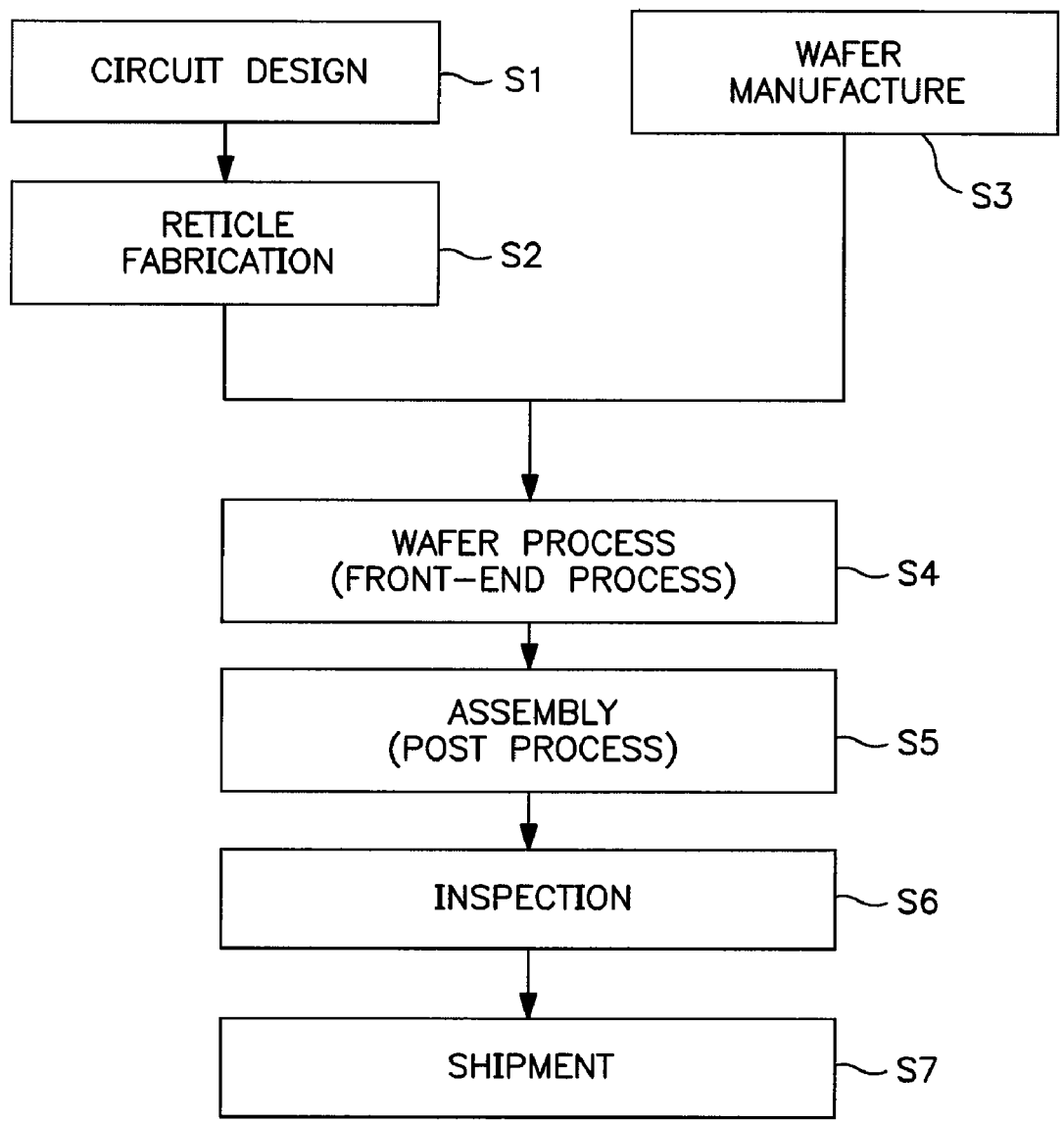
FIG. 9 is a flowchart that explains a method for manufacturing a device using the exposure apparatus.

Next, with reference to FIG. 9 and FIG. 10, the embodiment of a device manufacturing method using the above-described exposure apparatus 100 will be described. FIG. 9 is a flowchart for explaining the manufacture of a semiconductor device (e.g., a semiconductor chip, such as an IC or an LSI, a liquid crystal panel or a CCD sensor).

Step 1 (circuit design) carries out a circuit design of the semiconductor device.

Step 2 (mask fabrication) fabricates a mask in which the designed circuit pattern is formed.

On the other hand, Step 3 (wafer manufacture) uses a material, such as silicon, to manufacture a wafer.

Step 4 (wafer process) is called a front-end process, and uses the above-prepared mask and wafer to form an actual circuit on the wafer by the lithography technique.

Step 5 (assembly) is called a post process, which is a step of using the wafer prepared by Step 4 to provide a semiconductor chip. Step 5 includes steps such as an assembly step (dicing, bonding) or a packaging step (chip packaging).

Step 6 (inspection) carries out an inspection of the semiconductor device manufactured by Step 5 (e.g., an operation check test, and a durability test). The semiconductor device is completed through the steps as described above and is shipped (Step 7).

Figure 10:
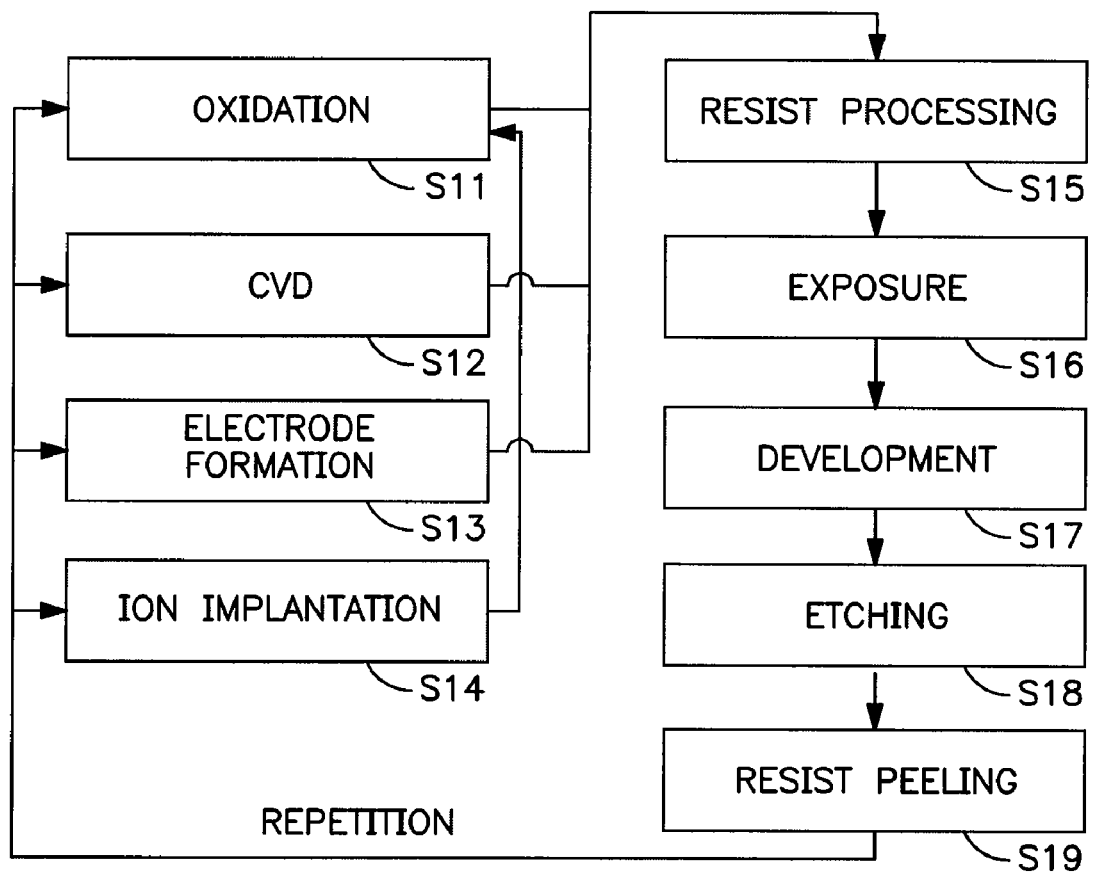
FIG. 10 is a detailed flowchart of a wafer process of Step 4 shown in FIG. 9.

FIG. 10 is a detailed flowchart illustrating the wafer process of Step 4 shown in FIG. 9.

Step 11 (oxidation) oxidizes the surface of the wafer. Step 12 (CVD) forms an insulating film on the surface of the wafer. Step 13 (electrode formation) forms an electrode on the wafer by vapor deposition, for example. Step 14 (ion implantation) carries out ion implantation in the wafer. Step 15 (resist processing) coats a photosensitive material over the wafer. Step 16 (exposure) uses the exposure apparatus 100 to expose a mask circuit pattern to the wafer. Step 17 (development) develops the exposed wafer. Step 18 (etching) cuts off a part other than the developed resist image. Step 19 (resist peeling) removes the resist not required anymore after the etching.

The repetition of these steps forms multiple circuit patterns on the wafer. The manufacturing method of this embodiment uses the projection optical system adjusted based on an accurately-measured aberration and, thus, can manufacture an accurate semiconductor device that has been manufactured with difficulty using a conventional method.

As described above, the above embodiments can realize a reflective optical element that has superior abrasion resistance characteristic, that has a superior abrasion resistance characteristic, that has a high reflectivity in a wide wavelength region, that can provide a phase difference of 90° or less between the reflected S-polarized light component and the reflected P-polarized light component, and that has a small fluctuation to the wavelength of the phase difference characteristic. The use of this reflective optical element for the exposure apparatus can provide an exposure apparatus that has superior throughput, imaging performance, and position accuracy.

Furthermore, the present invention is not limited to these embodiments, and various variations and modifications may be made without departing from the scope of the present invention.

For example, the present invention also can be applied to a step-and-repeat type exposure apparatus.

What is claimed is:

1. An exposure apparatus comprising:
    (A) an illumination optical system that illuminates a reticle with illumination light from a light source; and
    (B) a projection optical system that includes a reflective optical element and projects a pattern of the reticle onto a member to be processed,
    wherein the apparatus exposes the member to be processed with exposure light irradiated thereon via the projection optical system,
    wherein the reflective optical element includes:
        (a) a base member; and
        (b) a dielectric multilayer film laminated on the base member, and
    wherein the dielectric multilayer film includes, in an order from a base member side,
        (i) a first multilayer group that is constituted by laminating at least four dielectric material layers, which includes at least two dielectric material layers having different refractive indices from each other and that has a first period length equivalent in optical film thickness, and
        (ii) a second multilayer group that is constituted by laminating at least four dielectric material layers, which includes at least two dielectric material layers having different refractive indices from each other and that has a second period length equivalent in optical film thickness longer than the first period length equivalent in optical film thickness,
    wherein, the dielectric multilayer films include a plurality of pairs of the first and second multilayer groups, and
    wherein, when at least a part of light entering the reflective optical element has a wavelength range between $2 k_{min}\lambda_0/4$ and $2 k_{max}\lambda_0/4$, specific multilayer groups that constitute the plurality of pairs of multilayer groups and have a period length equivalent in optical film thickness between $k_{min}\lambda_0/4$ and $k_{min}\lambda_0/4$ satisfy a condition in which the period lengths equivalent in optical film thickness of the specific multilayer groups are, in an order from a base member side specific multilayer group, $$k_1\lambda_0/4 < k_2\lambda_0/4 < \ldots k_i\lambda_0/4 \ldots < k_n\lambda_0/4$$

where $k_{min} \leq k_1 < k_2 < \ldots k_i \ldots < k_n \leq k_{max}$, $1 \leq i \leq n$, $n \geq 2$,
$k_n$ is a positive value, and
i is a positive integer.

2. The exposure apparatus according to claim 1, further comprising an alignment mechanism that aligns positions of the reticle and the member to be processed.

3. A device manufacturing method comprising the steps of:
exposing the member to be processed using the exposure apparatus according to claim 1; and
developing the exposed member.

* * * * *